Dec. 16, 1958 I. J. KAAR 2,864,897

UNIVERSAL PHONOGRAPH PICKUP HEAD OR THE LIKE

Filed Feb. 17, 1958 2 Sheets-Sheet 1

IRA J. KAAR
INVENTOR.

BY [signature]

ATTORNEY

UNIVERSAL PHONOGRAPH PICKUP HEAD OR THE LIKE

Filed Feb. 17, 1958

2 Sheets-Sheet 2

IRA J. KAAR
INVENTOR.

BY [signature]

ATTORNEY

United States Patent Office 2,864,897
Patented Dec. 16, 1958

2,864,897

UNIVERSAL PHONOGRAPH PICKUP HEAD OR THE LIKE

Ira J. Kaar, Los Angeles, Calif., assignor to Hoffman Electronics Corporation, a corporation of California Application February 17, 1958, Serial No. 715,683

7 Claims. (Cl. 179—100.41)

This invention relates to improvements in acousti-electrical transducers and, more particularly, to a phonograph sound reproducing head of the variable reluctance type capable of selectably reproducing recordings of a lateral or hill-and-dale type while at the same time being capable of reproducing stereophonic recordings.

With the pending advent of dual track single groove record discs the need for a reproducing or pickup head capable of high fidelity performance has become imperative. Variable reluctance pickups of the type described in U. S. Patent No. 2,511,663 issued to W. S. Bachman have received wide acclaim for their faithful reproduction of monaural or single track recordings. To date, however, the only stereophonic reproducing heads which have been announced commercially have utilized piezoelectric material such as barium titanate for transforming mechanical motion into electrical voltage. These systems generally have lower compliance and poorer frequency response characteristics than can be obtained with the high compliance, low mass system utilized in variable reluctance pickups. Furthermore, such pickup heads or transducers are not universal in their usage, that is, they cannot be used selectively for stereophonic, lateral or vertical record reproduction.

Therefore, it is an object of this invention to provide an acousti-electrical transducer which will reproduce from a record disc with high fidelity dual track single groove stereophonic information.

It is a further object of this invention to provide a phonograph pick-up or reproducing head which is capable of selectively reproducing stereophonic, lateral, or hill-and-dale types of recordings from record discs.

According to the present invention there is provided a variable reluctance phonograph pickup head which includes in its magnetic circuit a permeable cantilever element which is coupled at one end to a permanent magnet and has at its other end an armature portion formed into a pair of flat wings extending at right angles to each other, each of said wings being supported normally in a central position with respect to its associated pole piece and a common central pole piece. The apex formed by the intersection of the two wings supports a needle or stylus the tip of which lies substantially along the axis of the cantilever member. In order that the reproducing head might function properly with the recently approved stereophonic system accredited to Westrex, Inc. the orthogonally related wing sections are rotated to a position so that they lie at angles of 45° and 135°, respectively, if viewed in a system of Cartesian coordinates. Because of the 90° relationship between the reproducer armatures and the corresponding 90° relationship between the record tracks in a disc made according to the Westrex system, and assuming that the point of the needle or stylus lies along the center line of the cantilever element, motion of the stylus along the undulations in one of the record tracks will produce transverse motion of one armature in one of the air gaps but will not produce transverse motion of the other armature in its air gap. The flux flowing in the pole piece associated with the first armature will vary but that flowing in the pole piece associated with the second armature will not vary. If field coils are placed on the two pole pieces, a voltage output will appear at the terminals of one of the coils but not from the other. If the voltages generated in the respective coils as a result of the undulations appearing in their associated record grooves are reproduced through separate amplifiers and reproduced on separate loud-speakers, stereophonic or binaural effects will be heard as recorded. Where monaural records are being reproduced as, for example, hill-and-dale recordings or lateral recordings, the output from the several field coils may be combined in a predetermined manner to provide the desired output.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which Figure 1 is a perspective view of the magnetic circuit and elements involved in the present invention.

Figure 1:
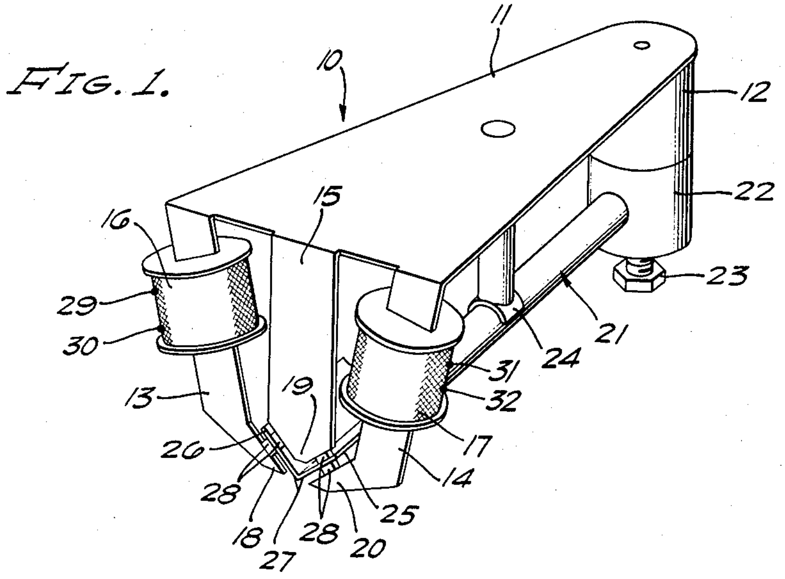

In Figure 1 reproducer 10 includes carrier portion 11 which is of magnetically permeable material one end of which is secured in contiguous relationship with permanent magnet 12. The other end of carrier 11 terminates in left pole element 13, right pole element 14 and common pole element 15. These pole elements may be made integrally with carrier 11 as, for example, by stamping and forming from a common piece of sheet soft iron. Field coil 16 is provided on left pole 13 and field coil 17 is provided on right pole piece 14. Tip 18 of pole piece 13 lies parallel to and spaced from a predetermined extent of tip portion 19 of common pole 15. Similarly, tip portion 20 of pole portion 14 lies parallel to and spaced from a predetermined extent of tip portion 19 of common pole piece 15.

Figure 2:
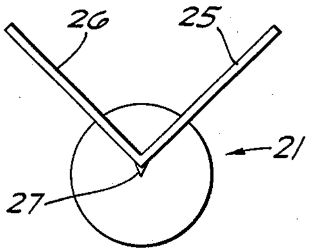
Figure 2 is an end view of a portion of the mechanism of Figure 1.

Cantilever element 21, which may be of soft iron, wire or the like, is coupled at one end either directly to permanent magnet 12 or, as shown, to a low permeability material 22, such as brass, soldered or welded to permanent magnet 12. The purpose of interposing low-permeability element 22 is to improve the amplitude linearity of the pickup. Cantilever 21 may be removably secured as by set screw 23. Damping block 24 of suitable material, such as cellulose nitrate or the like, may be interposed between cantilever element 21 and carrier 11 to prevent undesired harmonic vibration of cantilever element 21. The end of cantilever element 21 remote from permanent magnet 12 may be swaged flat and formed into orthogonally disposed wings 25 and 26, as can be seen more clearly from Figure 2. Stylus or needle 27 is secured at the apex formed by the intersection of wings 25 and 26 and, as nearly as possible, the tip of stylus 27 is made to lie along the center line of cantilever element 21, as can be seen more clearly from Figure 3.

Wings 25 and 26, which are permeable and part of the magnetic circuit of this device, are positioned to lie midway between pole portions 20, 21 and portions 18, 19, respectively, when stylus 27 is resting on a record disc. Damping elements 28 may be interposed between wings 25 and 26 and their associated pole tip portions to provide damping of undesired mechanical resonances and also to prevent excessive excursion of wing elements 25 and 26 under abnormal excitation or loading conditions.

Figure 4:
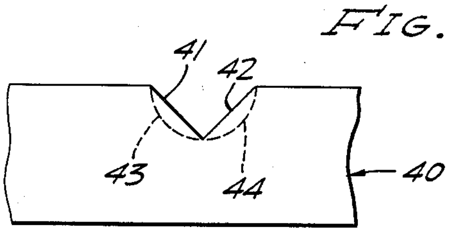
Figure 4 is a sectional view of a record to be reproduced.

In Figure 4 record disc 40 carries record tracks 41 and 42 disposed at right angles to each other and 45° off horizontal and vertical reference lines. Distinctive and distinguishable information is recorded in the undulations 43 and 44 associated with tracks 41 and 42, respectively.

The apparatus in Figures 1 through 4 operates as follows. Magnetic flux from permanent magnet 12 flows through cantilever arm 21 through armatures or wings 25 and 26, through right, left and common pole pieces 14, 13 and 15, respectively, and back through carrier 11 to the opposite pole of permanent magnet 12.

When wings 25 and 26 are centrally disposed with respect to their associated pole tip portions, the flux flowing from each of the wings or armatures splits evenly between the left and right pole pieces 13 and 14, respectively, and common pole piece 15. This is a situation which exists as long as stylus 27 is riding in an undulation-free track, the flux flowing through field coils 16 and 17 is constant and there is no electrical output from terminals 29, 30, or 31, 32. However, assume for the moment that information has been recorded along track 42 of record disc 40 forming undulations 44. Wing 25 will then move towards pole tip portion 20 increasing the flux flow through pole piece 14 and producing a voltage output from field coil 17 according to Faraday's equation $$E = -K\frac{d\phi}{dt}$$

If the tip of stylus 27 lies along the center line of cantilever member 21, there will be no moment arm and hence no twisting of cantilever element 21 about its axis and armature or wing element 26 will simply move in its own plane remaining centrally disposed between tip portion 18 and tip portion 19, thus maintaining a constant flux flow through pole piece 13. No voltage will appear at terminals 29 and 30 of field coil 16.

Figure 3:
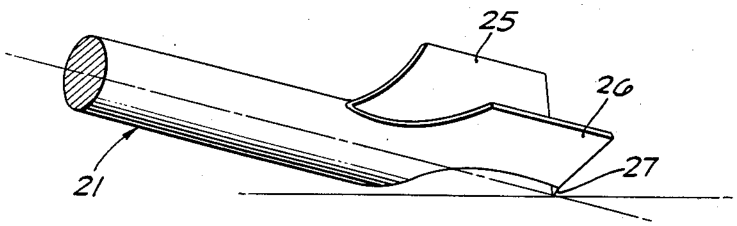
Figure 3 is a side view of the element of Figure 2.

Similarly, undulations 43 lying along track 41 will vary the position of wing element 26 with respect to pole tip portions 18 and 19, thus changing the flux through pole piece 13 and producing a voltage output at terminals 29 and 30 of field coil 16 while at the same time there will be no change in the centrally disposed position of wing or armature 25 and no voltage will appear at terminals 31 and 32 of field coil 17. Thus the audio signals appearing in undulations 43 and 44, respectively, may be reproduced independently of each other and if these signals are of a binaural or stereophonic nature they may be reproduced with separate amplifying channels and separate speakers. Of course, any tendency of cantilever element 21 to twist will produce cross-talk between the information appearing on the separate recording tracks. This will cause distortion of the reproduced information. The degree of distortion can be materially limited by proper positioning of stylus 27 as indicated in Figure 3.

Figure 5:
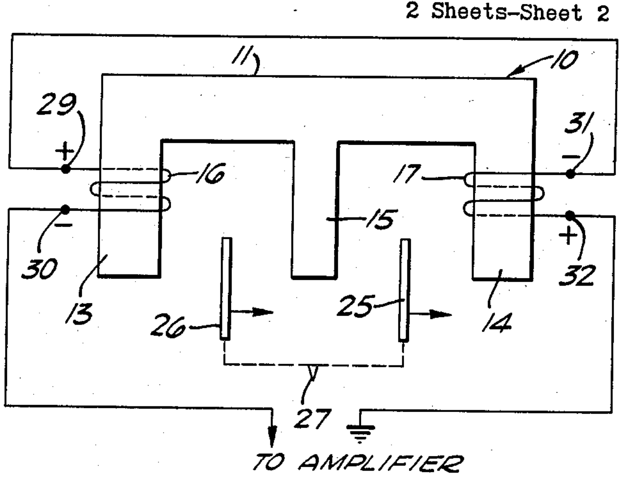
Figure 5 is a schematic diagram of the electrical circuit involved when the present invention is utilized in reproducing laterally recorded records.

Turning now to Figures 5 through 8, we find the electrical connections necessary for the reproduction of laterally, vertically or stereophonically recorded information. Figure 5 shows that as armature or wing element 26 moves away from pole piece 13, there is a simultaneous motion of wing element or armature 25 towards pole 14. This is the situation which arises when the reproducing head is being used to reproduce laterally recorded information. As a result of the described motion of armatures 25 and 26, the flux flowing through field coil 16 is reduced as the flux flowing through field coil 17 is increased. From Faraday's law described previously, it is known that the polarity of the potentials appearing at terminals 29 and 31, assuming the same direction of winding, as indicated in Figure 5, will be opposite, thus dictating the interconnection of terminal 29 to terminal 31 with output voltages being taken from terminals 30 and 32 for amplification.

Figure 6:
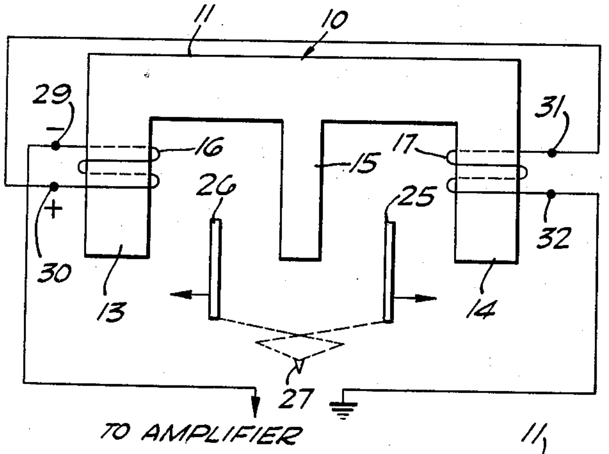
Figure 6 is a schematic diagram of the electrical circuit utilized when the present invention is to reproduce vertically recorded records.

When the reproducing head according to this invention is being used for reproduction of hill-and-dale or vertically recorded information, the relative motion of wing elements 25 and 26 is as shown schematically in Figure 6. As wing 26 approaches pole 13, wing 25 is approaching pole 14, hence the potentials appearing at terminals 29 and 31 are in phase necessitating the interconnection of terminal 31 to terminal 30 and the taking of the output potential from terminals 29 and 32.

Figure 7:
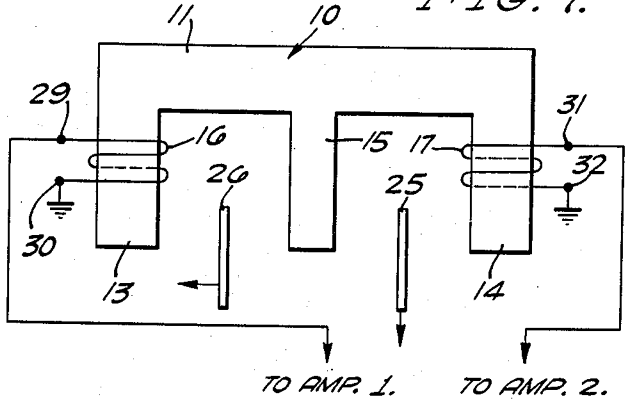
Figure 7 is a schematic diagram of the electrical circuit for the reproducing head according to the present invention when it is being used to reproduce multiple track stereophonic information.

In each of the foregoing two examples a single set of information has been recorded and must be reproduced. This requires a single amplifier. However, for stereophonic reproduction, a pair of amplifiers is required in order to produce stereophonic effects at their respective output speakers. As is indicated in Figure 7, because of the orthogonal relationship between wing elements 25 and 26 transverse motion of one of the wings does not produce transverse motion of the other. Hence, as wing 26 approaches pole 13, there is no relative shift of wing 25 with respect to pole 14 and an output voltage appears across terminals 29 and 30 which is independent of the output voltage across terminals 31 and 32. Hence, the output potentials at terminals 29 and 31 are fed to separate amplifiers and speakers for the reproduction of stereophonic information.

Figure 8:
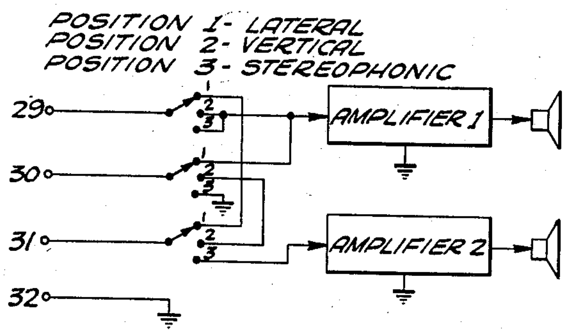
Figure 8 is a schematic diagram of certain electrical interconnections according to this invention.

A concise analysis of switching connections is shown in Figure 8 in which position 1 is the correct electrical interconnection to reproduce laterally recorded information, position 2 produces the correct electrical interconnections to reproduce vertically recorded information, and position 3 produces the correct electrical interconnections to reproduce stereophonically recorded information. Terminals 29, 30, 31 and 32, indicated in Figure 8 are the correspondingly numbered terminals of field coils 16 and 17 in Figure 1.

Thus, there has been described a variable reluctance type of acoustielectrical transducer which will by the simple selective interconnection of electrical terminals as indicated reproduce with fidelity information recorded vertically, laterally, or stereophonically on a record disc.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An acousti-electrical transducer including a source of magneto-motive force having first and second poles, left, right and common pole pieces magnetically coupled to said first pole of said source, said left and right pole pieces each having a pole tip portion disposed at right angles to that of the other, said common pole piece having a pair of tip portions at right angles to each other, each disposed in parallel relation to its respective one of said pole tip portions of said left and right pole pieces but spaced therefrom to form a pair of air gaps disposed at 90° to each other, a cantilever member of paramagnetic material coupled at one end mechanically and magnetically to the second pole of said source, an armature portion carried at the opposite end of said cantilever member, said armature portion including a pair of wing-shaped elements disposed at 90° to each other and flexibly positioned in the cooperating 90° air gap formed between said left, right and common pole pieces, a stylus carried by said wing-shaped elements, and first and second field coils, said first field coil cooperating with said left pole piece and said second field coil cooperating with said right pole piece.

2. Apparatus according to claim 1 in which said wing-shaped elements are integral with said cantilever member and with each other.

3. Apparatus according to claim 2 in which said stylus is positioned at the apex formed by the intersection of said wing-shaped elements.

4. Apparatus according to claim 2 in which the tip of said stylus lies substantially on an extension of the center said wing-shaped elements.

5. Apparatus according to claim 1 in which said first field coil has first and second terminals and said second field coil has third and fourth terminals, a reference potential terminal, a first output terminal and a second output terminal, said fourth terminal being connected to said reference potential terminal, and means for selectively connecting said first terminal to said third terminal while connecting said second terminal to said first output terminal; connecting said first terminal to said first output terminal while connecting said second terminal to said third terminal; and connecting said first terminal to said first output terminal while connecting said second terminal to said reference potential terminal and said third terminal to said second output terminal.

6. A phonograph transducer including a permanent magnet having first and second poles; a carrier element of paramagnetic material secured at one end to said first pole and terminating at the other end in left, right and common pole pieces, said left and right pole pieces each having a tip portion disposed at right angles to that of the other and said common pole piece having a pair of tip portions at right angles to each other, each disposed parallel to but spaced from one of said tip portions of said left and right pole pieces to form a pair of air gaps disposed at 90° to each other, a cantilever member of paramagnetic material coupled at one end mechanically and magnetically to said second pole of said permanent magnet, an armature portion carried at the opposite end of said cantilever member, said armature portion including a pair of wing-shaped elements disposed at 90° to each other and flexibly positioned in the cooperating right-angle-shaped air gap formed between said left, right and common pole pieces, a stylus coupled to said cantilever member, and first and second field coils, said first field coil being magnetically coupled to said left pole piece and said second field coil being magnetically coupled to said right pole piece.

7. Apparatus according to claim 6 in which a damping member is disposed between said cantilever member and said carrier element.

No references cited.